United States Patent [19]
Ibach et al.

[11] Patent Number: 5,617,712
[45] Date of Patent: Apr. 8, 1997

[54] CUTTER ASSEMBLY FOR MOWING APPARATUS

[75] Inventors: Adolf Ibach, Remscheid, Germany; Robert L. Powers, Easton, Ill.

[73] Assignee: Carl Sulberg GmbH & Co., Remscheid, Germany

[21] Appl. No.: 486,077

[22] Filed: Jun. 7, 1995

Related U.S. Application Data

[63] Continuation-in-part of Ser. No. 300,056, Sep. 2, 1994, abandoned.

[51] Int. Cl.⁶ ................................................ A01D 34/17
[52] U.S. Cl. .................. 56/298; 56/304; 56/311; 56/307
[58] Field of Search ........................... 56/298, 300, 304, 56/305, 306, 311, 307

[56] References Cited

U.S. PATENT DOCUMENTS

| | | | |
|---|---|---|---|
| 304,686 | 9/1884 | Allen | 56/304 |
| 379,881 | 3/1888 | Voss | 56/304 |
| 644,060 | 2/1900 | Cleveland | 56/305 X |
| 870,358 | 11/1907 | Griffiths | 56/305 |
| 2,024,309 | 12/1935 | Smith | 56/305 |
| 3,099,125 | 7/1963 | Turner | 56/298 X |
| 3,298,164 | 1/1967 | Salyards | 56/305 |
| 3,455,093 | 7/1969 | Stern | 56/305 |
| 3,722,196 | 3/1973 | Templeton | 56/298 |
| 4,553,380 | 11/1985 | O'Halloran | 56/298 X |
| 5,343,682 | 9/1994 | Puncochar | 56/305 |

FOREIGN PATENT DOCUMENTS

| | | |
|---|---|---|
| 2546367 | 11/1984 | France . |
| 1155464 | 6/1969 | United Kingdom . |

*Primary Examiner*—George A. Suchfield
*Attorney, Agent, or Firm*—Synnestvedt & Lechner

[57] ABSTRACT

A cutter assembly for mowing apparatus comprises a sickle guard having individual guards which each consist of a guard body and an upper lip. The guard bodies are connected to a cutter bar via mounting pads. Each guard is provided with a rearward knife slot within which knife sections can move back and forth in a reciprocating manner. A hold-down member is provided to act against an upper face of a knife section, the hold-down member extending through the upper lip.

23 Claims, 2 Drawing Sheets

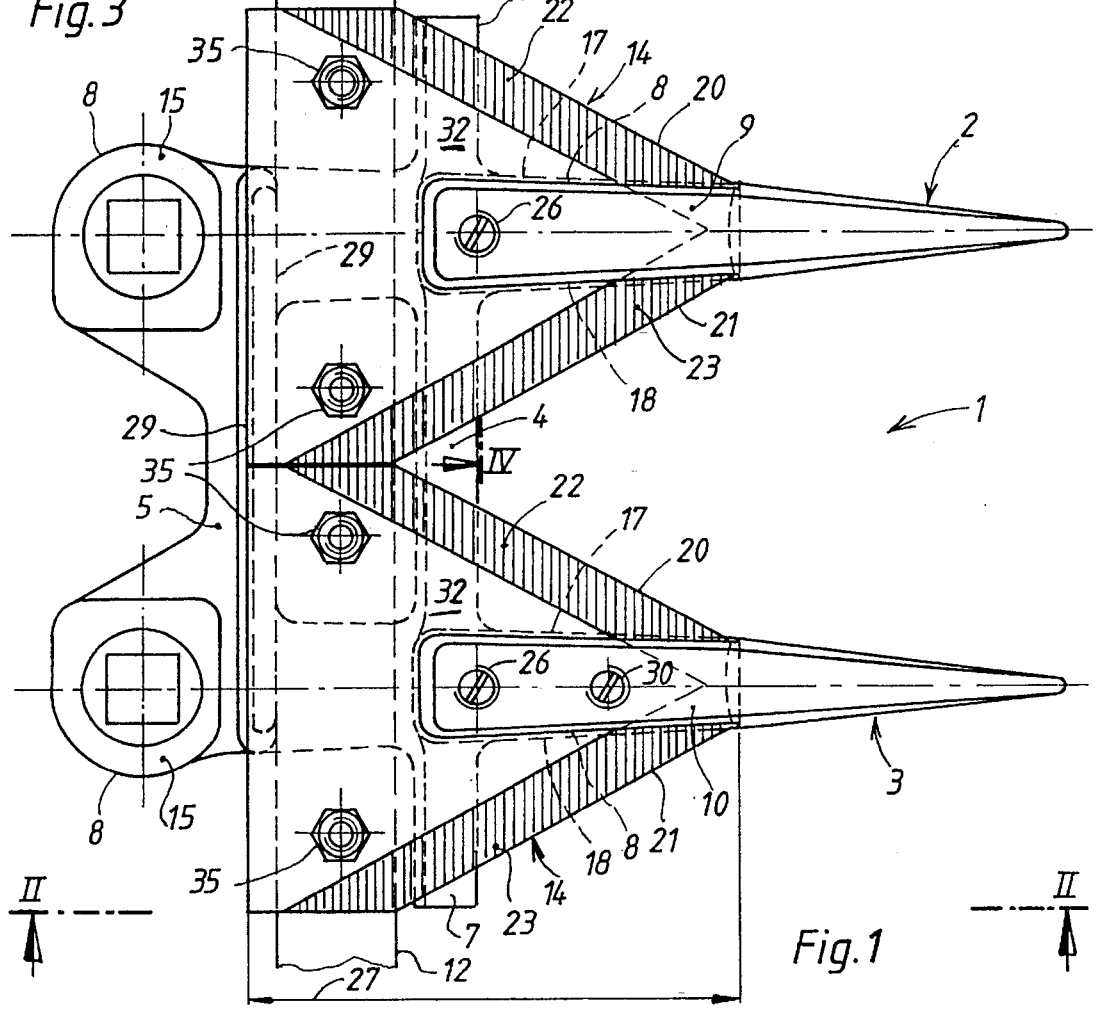

CUTTER ASSEMBLY FOR MOWING APPARATUS

CROSS-REFERENCE TO RELATED APPLICATIONS

The present application is a continuation-in-part of application Ser. No. 08/300,056 filed Sep. 2, 1994, now abandoned.

BACKGROUND OF THE INVENTION

1. Field of the Invention

The invention relates to a cutter assembly for mowing apparatus. The invention is more particularly concerned with a sickle guard for a cutter assembly of mowers. The cutter assembly comprises a sickle guard having at least one guard, wherein each guard comprises a guard body and an upper lip secured to the guard body, wherein between the guard body and the upper lip is provided a knife slot to receive knife sections secured to a reciprocable knife back, wherein each guard body has a ledger surface facing the knife sections and with lateral cutting edges, wherein each knife section is provided with a bottom face and lateral facets defining knife section cutting edges, wherein each guard is releasably secured at least by its guard body to a cutter bar, and wherein hold-down means are provided for holding down the knife sections in the direction towards the ledger surface of the guard bodies.

2. Description of the Prior Art

In one known sickle guard of this type (GB-A-1155464) cast or forged hold-down clips 13 are arranged at spaced intervals along a mounting member 10. Each clip 13 is T-shaped in plan view and is fixed by means of two guard mounting screws 18 to the cutter bar 10. A forwardly extending portion 43 has an undersurface 45 arranged to come into sliding contact with the upper faces of the knife sections 31. The clips 13 and their assembly and possible adjustment perpendicular to the upper faces of the knife sections 31 are costly and heavy.

From U.S. Pat. No. 3,722,196 it is known to divide each hold-down clip 21 into a mounting flange 23 and a hold-down arm 22 which is linked thereto at 39 and 40 so as to be capable of being raised and lowered. By means of an adjustment screw 43 inserted into the rearward end of the hold-down arm 22 and engaging at 44 against the cutter bar 11, there is a minimum distance between a lower guide face 41 of the hold-down arm 22 and the knife sections 19. This design requires increased expenditure.

From the French patent application 2546367 A1 it is known to adjust the height of the knife slot 62 so that instead of an upper lip, one has a separate upper portion 54 of the sickle guard 12 which is able to be raised and lowered on a mounting screw 14. The upper portion 54 has a fixed support runner 70 behind the screw 14 and an adjustable support screw 68 in front of the screw 14. The supports 68 and 70 rest on a carrier plate 48 which is supported on the cutter bar 10 by means of a spacer plate 14. This design is associated with particularly high manufacturing and assembly costs.

SUMMARY OF THE PRESENT INVENTION

It is an object of the present invention to simplify and to improve the means whereby the knife sections are held down.

This object is achieved by the hold-down means comprising, at least for some of the upper lips, respectively at least one hold-down member which is movable into contact with a top face of the associated knife sections.

The holding down of the knife sections has the purpose of achieving and maintaining optimum cutting action between the knife section cutting edges and the cutting edges of the guards which cooperate therewith. If there is too great a distance between these cutting edges transversely to the stroke direction of the knife sections, then the growth and material to be cut will not be cut cleanly but rather will be squashed or knocked off. This can lead to damage of the mowing apparatus in use and to an increased requirement for drive energy. Furthermore, there is the danger that with unhindered upward movement of the knife sections in use, these knife sections could strike against the upper lips of the guards during their reciprocating stroke movement. This could lead to breakage of guards and to damage to the knife sections. The hold-down elements of the present invention can be used with advantage independently of the type of the particular guard and independently of the type of knife sections which are used. Thus, one can even use knife sections with serrated facets without any difficulty. By means of the hold-down elements of the present invention, special, bulky hold-down means fixed to the cutter bar are superfluous. The hold-down means of the present invention also mean that there is a considerable reduction in the weight carried by the cutter bar in total and ensures a better flow of crops.

Each hold-down element is preferably adjustable relative to its upper lip in the direction towards and away from the knife sections. This gives the advantage that the knife section cutting edges are always brought into the optimum position in relation to the corresponding cutting edges on the guards. As a rule, it is desirable that the undersides of the knife sections press with little force against the cutting surfaces of the guards. Subsequent adjustment can be carried out rapidly and accurately even during the mowing operation.

Preferably, each hold-down element has an external thread and the upper lips are provided with tap holes into which the hold-down elements are fitted. This results in a particularly simple and easy mounting of the hold-down elements in the upper lips. Also, eventual replacement of hold-down elements can be effected with little cost.

In one embodiment, each hold-down element comprises a ball member biased into contact with the upper face of the knife sections by spring means. This gives a functionally reliable and very low friction design for the hold-down elements. They can be formed, for example, as ball plungers. This type of hold-down element may further include stop means for limiting displacement of the ball member from the hold-down element. This reduces wear on the hold-down elements and on the knife sections.

In another embodiment, the hold-down element comprises a bolt-like member screwed into the threaded bore of the upper lip, to hold down the knife section.

On the respective upper lip there is preferably provided a hold-down element at least approximately in a plane extending through the centers of the length dimension of the knife sections measured transversely to the stroke direction of the knife sections. In this way, the hold-down elements are in contact with each knife section over a sufficient length. Moreover, this positioning is sufficiently far forward in order to counteract any upward movement of the knife sections in use.

In a preferred embodiment of the invention, a hold-down element is provided on the respective upper lip over a forward region of the knife sections. This has the advantage that the hold-down elements remain in contact with the knife sections with a comparatively short lever arm. This arrangement is recommended particularly as a supplementary fitting to the arrangement of hold-down elements as described in the preceding paragraph.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

The foregoing summary, as well as the following detailed description, will be better understood when read in conjunction with the figures appended hereto. For the purpose of illustrating the invention, several embodiments are shown in the drawings. It is understood, however, that this invention is not limited to the precise arrangement and instrumentalities shown. In the drawings:

FIG. 1 is the plan view of a sickle guard formed as a double sickle guard and illustrating two different embodiments;

FIG. 2 is the sectional view taken along the line II—II in FIG. 1;

FIG. 3 is a view on an enlarged scale of the circled detail III in FIG. 2, partly in longitudinal section showing one embodiment of a hold-down element;

FIG. 4 is a partial sectional view taken along the line IV—IV in FIG. 1;

DESCRIPTION OF THE PREFERRED EMBODIMENT

Figure 5:
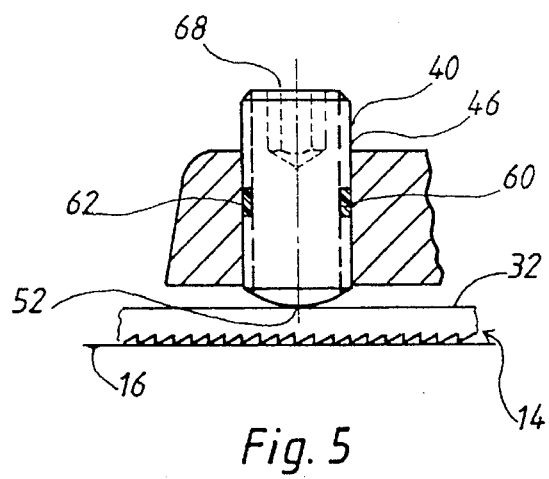
FIG. 5 is a sectional view of another embodiment of a hold-down element.

The sickle guard 1 shown in FIG. 1 comprises two guards 2 and 3 which are connected rigidly together to form a one-piece double sickle guard, at the front by an inner trash bar 4 and at the back by a connecting web 5. At the level of the inner trash bar 4 each guard 2, 3 carries on the outside an outer trash bar 6 and 7 respectively.

Each guard 2, 3 comprises a guard body 8 and an upper lip 9 and 10 fixed to the guard body 8, at the right-hand side as shown in FIG. 1. Between each guard body 8 and its upper lip 9, 10 there is a knife slot 11 (FIG. 2) to receive knife sections 14 which are secured to a reciprocable knife back 12 by special screws 13 and self-locking special nuts 35. The knife back 12 is supported at the rearward side by a wear bar 29 of the guard bodies 8.

Each guard body 8 is releasably securable via a mounting pad 15 and by means of guard mounting screws to a cutter bar of a mower in a known manner.

Each guard body 8 has a ledger surface 16 (FIG. 2) with lateral cutting edges 17 and 18 facing the knife sections 14. Each knife section 14 is provided with a bottom face 19 (FIG. 2) and, at the sides, with facets 22 and 23 defining knife section cutting edges 20 and 21. In this case the facets 22, 23 are serrated. The facets could, however, alternatively be ground smoothly onto the knife sections or could be formed in some other way known per se.

In FIG. 1 the knife sections secured to the knife back 12 are drivable back and forth in stroke directions 24 indicated by a double-headed arrow.

Hold-down means is provided for holding down the knife section 14 in the direction towards the ledger surface 16 of at least one of the guard bodies. The hold-down means comprises at least one hold-down element 26 associated with at least one of the upper lips. The hold-down element 26 is movable into contact with the top face of the knife section. Preferably, the hold-down element 26 is adjustable relative to the associated upper lip 9, 10 in the direction towards and away from the knife sections 14. More preferably, the hold-down element 26 has an external thread for engaging a respective bore or tap hole in the upper lip in which the hold-down element is received.

FIG. 1 illustrates two examples of the guard 2,3. In one example (guard 2) a hold-down element 26 is screwed downwards from above, in a rearward tap hole of the upper lip 9. In this particular example, a hold-down element in the form of a ball plunger 26, which is further described below, is shown. The hold-down element 26 is located at least approximately in a plane 28 which passes through the centers of the length dimension 27 of the knife sections 14 measured transversely to the stroke direction 24 of the knife sections 14.

In the other example (guard 3), the other upper lip 10 again has, towards the rearward end, a hold-down element 26 at the same position as in the case of the upper lip 9. However, the upper lip is provided over a forward region of the knife sections 14 with an additional hold-down element 30 which, again in this example, is in the form of another ball plunger.

Illustrated in FIGS. 2–4 is one preferred embodiment of the hold-down element 26, 30. FIG. 2 shows that for each hold-down element 26, 30 a ball 31 is pushed into contact with a top face 32 of the knife section 14. Each ball 31 is, as shown in FIG. 3, biased into contact with the top face 32 of the knife section 14 by a biasing member 33 located within the hold-down element 26 which is formed as a screw. The biasing member 33 comprises a compression spring in the illustrated embodiment. The magnitude of the biasing force can be adjusted by the introduction of a screwdriver into an upper screw slot 34 of each hold-down element 26, 30 and the particular hold-down element 26, 30 can then be rotated relative to the upper lip 9, 10.

FIG. 2 shows the design and arrangement of the special screws 13 and the special nuts 35 by which the knife sections 14 are secured to the knife back 12.

As shown in FIG. 3, the screw sleeve of the hold-down element 26 extends down below the horizontal diameter of the ball 31 to form an abutment edge and thus forms a stop 37 which limits the outward movement of the ball 31 from the hold-down element 26.

This limiting effect is illustrated in FIG. 4, where at the left-hand side in solid lines the ball 31 is shown in contact with the top face 32 of the knife section 14. In contrast, at the right-hand side of FIG. 4, in chain-dotted lines, the ball 31 is shown in the position which it adopts when the ball has overrun the facet 23 by a small amount and then has been prevented from further outward movement by the stop 37. This defines a pressure stroke 38 for the ball 31. This pressure stroke 38 can be kept comparatively small.

Figure 6:
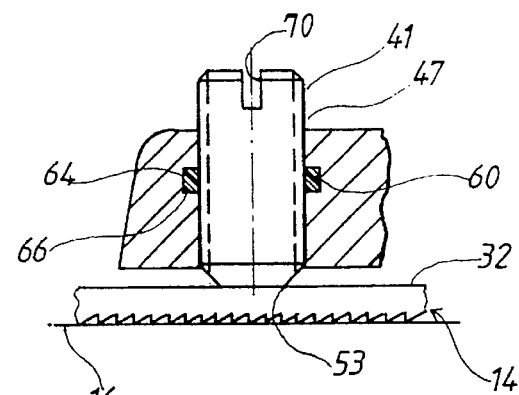
FIG. 6 is a sectional view of a further embodiment of a hold-down element.

Additional preferred embodiments of the hold-down element are illustrated in FIGS. 5–10. Each hold-down element 40, 41, 42, 43, 44, and 45 is shown as a solid bolt-like screw member 46, 47, 48, 49, 50, and 51, respectively, having an external thread adapted to be screwed into a threaded bore or tap hole of the upper lip 9, 10 from above in a similar manner as previously described for hold-down element 26, 30. FIGS. 5 and 6 show hold-down elements 40 and 41 in relation to upper lip 9 and knife section 14. Adjustment of the hold-down elements 40, 41, 42, 43, 44, and 45 to hold down knife section 14 is made by rotating the hold-down element to the desired position. Overtightening is avoided by placing a thin piece of material, preferably a very thin steel sheet, between the bottom 52, 53, 54, 55, 56, 57, respectively, of the hold-down element 40, 41, 42, 43, 44, 45 and the top face 32 of the knife section 14. The sheet is then pulled out sideways and the system adjusted. The "play" between the bottom 52, 53, 54, 55, 56, 57 and knife section 14 should be minimal and the steel sheet correspondingly very thin.

Figure 10:
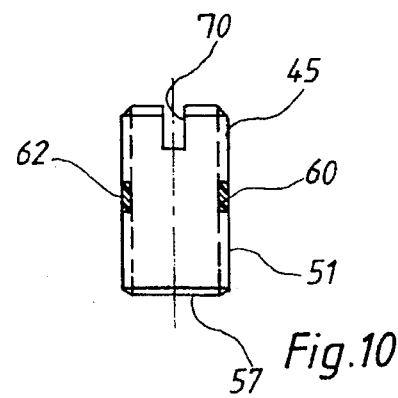
FIG. 10 is a side view of yet another embodiment of a hold-down element.

The hold-down elements 40, 41, 42, 43, 44, and 45 preferably have standard end configurations of threaded bolts such as the corresponding ones according to German Standard DIN 78, Einführung in die DIN-Normen, 1985, which is hereby incorporated by reference. FIG. 10 in particular represents a non-standard screw bolt whose lower end has simply been cut transversely to the longitudinal axis and the outer edge rounded a little bit. These bolt-like members preferably have a normal metrical ISO thread M 8×1, 25 mm, with an outer diameter of 8 mm and, preferably, a property class of 10.9 or 12.9 according to German Standard DIN ISO 898 T1, Einführung in die DIN-Normen, 1985, which is hereby incorporated by reference. These materials have good strength and wear-resistant properties. It is understood that the hold-down element is not limited to these property classes as any suitable property class can be used. For example, property classes 5.8, 6.8, 8.8, and 9.8 of DIN ISO 898 T1 is also known to be acceptable.

Each of the bolt-like members in FIGS. 5 to 10 is shown with a locking element 60 for preventing inadvertent loosening of the hold-down element once it has been set to its operative position as explained above. In FIGS. 5 and 7–10, the locking element 60 comprises a thin layer of material, preferably a synthetic adhesive-like material, that is applied to a ring-like area 62 of the thread of the bolt or the bore. Such locking elements are known in the art and allow removal of the bolt when necessary.

In FIG. 6 another locking element embodiment is shown. A groove 64 is provided in the wall of the bore and a ring 66 of locking material embedded therein. Ring 66 projects radially into the path of the bolt 47 just enough to create the desired amount of friction for the bolt to stay in place. Any type of suitable locking element, including any type of locking means as known in the art, may be used to lock the hold-down element in place and prevent inadvertent loosening.

Figure 7:
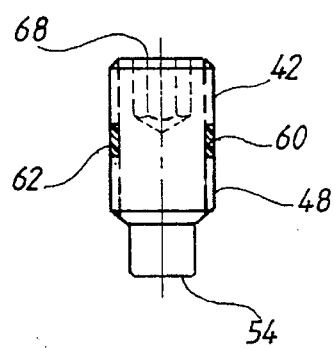
FIG. 7 is a side view of still another embodiment of a hold-down element.
Figure 8:
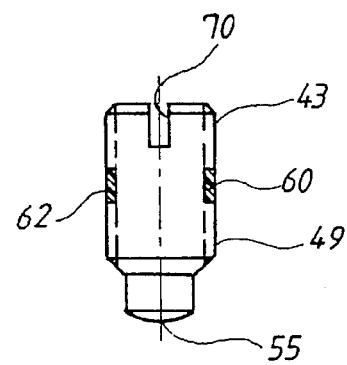
FIG. 8 is a side view of another embodiment of a hold-down element.
Figure 9:
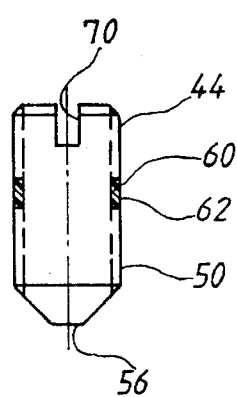
FIG. 9 is a side view of another embodiment of a hold-down element.

In FIGS. 5 and 7, the bolt-like member is shown as having a hexagon socket 68, whereas in FIGS. 6, 8, 9, and 10, a screw slot 70 is provided for turning the bolt member. Any means for rotating the hold-down member may be used.

It will be recognized by those skilled in the art that changes may be made to the above-described embodiments without departing from the broad scope of the invention. It is understood that this invention is not limited to the particular embodiments disclosed, but is intended to cover all modifications which are within the scope and spirit of the invention as defined by the appended claims.

I claim:

1. A cutter assembly for a mowing apparatus, comprising:

a sickle guard having at least one guard, said guard comprising a guard body and an upper lip fixed to said guard body;

a knife slot between said guard body and said upper lip to receive at least one knife section secured to a reciprocable knife back;

wherein said guard body has a ledger surface facing said knife section said ledger surface having lateral cutting edges;

wherein said knife section has a bottom face and facets defining knife section cutting edges;

wherein said guard is releasably secured to a cutter bar; and hold-down means for holding down said knife section in the direction towards said ledger surface of said guard body, wherein said hold-down means extends from said upper lip and is movable relative to said upper lip into contact with a top face of said knife section.

2. A cutter assembly according to claim 1 wherein said hold-down means is adjustable relative to said upper lip in the direction towards and away from the knife section.

3. A cutter assembly according to claim 2 wherein said hold-down means has an external thread, and said upper lip has a tap hole to receive said threaded hold-down means.

4. A cutter assembly according to claim 1 wherein said hold-down means comprises a ball member and spring means biasing said ball member into contact with said upper face of the knife section.

5. A cutter assembly according to claim 4 wherein said hold-down means further comprises stop means to limit displacement of said ball member.

6. A cutter assembly according to claim 1 wherein said hold-down means is arranged in said upper lip approximately positioned in a plane extending through the center of the length dimension of said knife section measured transversely to the stroke direction of said knife section.

7. A cutter assembly according to claim 1 wherein said hold-down means is disposed in said upper lip over a forward region of said knife section.

8. A cutter assembly according to claim 6 wherein said hold-down means is disposed in said upper lip over a forward region of said knife section.

9. A cutter assembly according to claim 1 wherein said hold-down means comprises a bolt-like member.

10. A cutter assembly according to claim 9 wherein said hold-down means further comprises a locking element to prevent inadvertent loosening of said hold-down element.

11. A cutter assembly according to claim 3 wherein said hold-down means comprises a locking element to prevent inadvertent loosening of said hold-down element.

12. A cutter assembly comprising:

a sickle guard having at least one guard, each said guard having a guard body and an upper lip secured to said guard body and said guard body releasably securable to a cutter bar;

a knife slot between said guard body and said upper lip to receive a knife section secured to a reciprocable knife back, said knife section having a bottom face and lateral facets defining knife section cutting edges;

a ledger surface on said guard body, said ledger surface facing said knife section and having lateral cutting edges; and said upper lip having at least one hold-down element for holding down said knife section in the direction towards the ledger surface of said guard body, said hold-down element movable into contact with a top face of said knife section.

13. A cutter assembly according to claim 12 in which said hold-down element is adjustable relative to its upper lip in the direction towards and away from the knife section.

14. A cutter assembly according to claim 13 in which said hold-down element has an external thread, and the upper lip has a respective tap hole to receive the threaded hold-down element.

15. A cutter assembly according to claim 12 in which said hold-down element comprises a biasing member for biasing the hold-down element into contact with the upper face of said knife section.

16. A cutter assembly according to claim 15 wherein said hold-down element comprises a ball member which is biased into contact with the upper face of said knife section by said biasing member, and which includes a stop on the hold-down element to limit displacement of the ball member from the hold-down element.

17. A cutter assembly according to claim 12 in which in the respective upper lip there is arranged said hold-down element which is approximately positioned in a plane extending through the center of the length dimension of the knife section measured transversely to the stroke direction of the knife section.

18. A cutter assembly according to claim 12 wherein said hold-down element is positioned in the respective upper lip over a forward region of the knife section.

19. A cutter assembly according to claim 17 wherein a second hold-down element is positioned in the respective upper lip over a forward region of the knife section.

20. A cutter assembly according to claim 12 wherein said hold-down element comprises a bolt-like member having an external thread.

21. A cutter assembly according to claim 12 wherein said hold-down element comprises a locking element to prevent inadvertent loosening of said hold-down element.

22. A cutter assembly according to claim 20 wherein said hold-down element comprises a locking element to prevent inadvertent locking of said hold-down element.

23. A cutter assembly according to claim 12 wherein said locking element comprises a ring of locking material.

* * * * *